United States Patent
Chen et al.

(10) Patent No.: US 10,674,539 B2
(45) Date of Patent: *Jun. 2, 2020

(54) SYSTEM AND METHOD FOR MANAGING CONTENTION IN A WIRELESS COMMUNICATIONS SYSTEM

(71) Applicant: Futurewei Technologies, Inc., Plano, TX (US)

(72) Inventors: Bin Chen, Shenzhen (CN); George Calcev, Hoffman Estates, IL (US); Lin Cai, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/982,849

(22) Filed: May 17, 2018

(65) Prior Publication Data
US 2018/0270858 A1     Sep. 20, 2018

Related U.S. Application Data

(63) Continuation of application No. 13/623,769, filed on Sep. 20, 2012, now Pat. No. 9,992,796.

(Continued)

(51) Int. Cl.
*H04W 74/08* (2009.01)
*H04W 72/12* (2009.01)
(Continued)

(52) U.S. Cl.
CPC ............ *H04W 74/08* (2013.01); *H04W 28/04* (2013.01); *H04W 72/121* (2013.01); *H04W 74/002* (2013.01); *H04W 74/085* (2013.01)

(58) Field of Classification Search
CPC ....... H04W 28/04–046; H04W 72/121; H04W 72/1289–1294; H04W 74/006–008; H04W 74/08–0891
See application file for complete search history.

(56) References Cited

U.S. PATENT DOCUMENTS

2003/0033394 A1   2/2003   Stine
2003/0137993 A1   7/2003   Odman
(Continued)

FOREIGN PATENT DOCUMENTS

CN         1581831 A     2/2005
CN       101132621 A     2/2008
(Continued)

OTHER PUBLICATIONS

3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 10), 3GPP TS 32.522, V10.2.0, Jun. 2011, 33 pages.

(Continued)

*Primary Examiner* — Eric Myers
(74) *Attorney, Agent, or Firm* — Slater Matsil, LLP

(57) ABSTRACT

A method for transmitting to an access point includes receiving a selection condition and a selection contention period from the access point, and comparing the selection condition to a selection parameter. The method also includes contending for use of a transmission medium during the selection contention period if the selection parameter meets the selection condition.

34 Claims, 11 Drawing Sheets

Related U.S. Application Data

(60) Provisional application No. 61/536,955, filed on Sep. 20, 2011.

(51) Int. Cl.
  *H04W 74/00* (2009.01)
  *H04W 28/04* (2009.01)

(56) References Cited

U.S. PATENT DOCUMENTS

| | | |
|---|---|---|
| 2003/0161279 A1 | 8/2003 | Sherman |
| 2003/0174665 A1 | 9/2003 | Benveniste |
| 2005/0025081 A1 | 2/2005 | Wakamatsu |
| 2005/0064817 A1 | 3/2005 | Ginzburg |
| 2006/0062181 A1 | 3/2006 | Chou |
| 2006/0099956 A1 | 5/2006 | Harada et al. |
| 2006/0159041 A1 | 7/2006 | Zhun |
| 2009/0052389 A1 | 2/2009 | Qin et al. |
| 2009/0122751 A1 | 5/2009 | Murugesu |
| 2009/0323611 A1 | 12/2009 | Singh et al. |
| 2010/0014472 A1 | 1/2010 | Denteneer et al. |
| 2010/0034214 A1 | 2/2010 | Zhang et al. |

FOREIGN PATENT DOCUMENTS

| | | |
|---|---|---|
| CN | 101785216 A | 7/2010 |
| CN | 1823501 A | 8/2016 |
| EP | 0993214 A1 | 4/2000 |
| JP | 2005026862 A | 1/2005 |
| JP | 2006314034 A | 11/2006 |
| WO | 2009025480 A1 | 2/2009 |

OTHER PUBLICATIONS

3rd Generation Partnership Project; Technical Specification Group Radio Access Network; Evolved Universal Terrestrial Radio Access Network; Evolved Universal Terrestrial Radio Access (E-UTRA) and Evolved Universal Terrestrial Radio Access Network (E-UTRAN); Overall description; Stage 2 (Release 10), 3GPP TS 36.300. V10. 4.0, Jun. 2011, 194 pages.

Aust, S., TGah STA Analysis for Smart Grid Use Case Mar. 14, 2011, 9 pages, IEEE 802.11-11/0355r0.

Halasz, D., Sub 1 GHz license-exempt MAC areas to consider Sep. 6, 2010, 9 pages, IEEE 802.11-10/1045r0.

Park, J., Station Group Management for 802.11ah May 10, 2011, 9 pages, IEEE 802.11-11/0762r0.

Seok, Y., et al., Association ID management for TGah Jan. 16, 2011, 7 pages, IEEE 802.11-11/0088r0.

Vegt, R., Potential Compromise for 802.11ah Use Case Document Mar. 17, 2011, 27 pages, IEEE 802.11-11/0457r0.

SYSTEM AND METHOD FOR MANAGING CONTENTION IN A WIRELESS COMMUNICATIONS SYSTEM

CROSS-REFERENCE TO RELATED APPLICATIONS

This application is a continuation of U.S. patent application Ser. No. 13/623,769, filed on Sep. 20, 2012, now U.S. Pat. No. 9,992,796, issued on Jun. 5, 2018, which claims the benefit of U.S. Provisional Application No. 61/536,955, filed on Sep. 20, 2011, which applications are hereby incorporated herein by reference in their entireties.

TECHNICAL FIELD

The present disclosure relates generally to digital communications, and more particularly to a system and method for managing contention in a wireless communications system.

BACKGROUND

Wi-Fi is a wireless standard for connecting electronic devices. Wi-Fi may also be known as IEEE 802.11. Generally, a Wi-Fi enabled device (also commonly referred to as a station), such as a personal computer, a tablet, a personal digital assistant, a video game console, a television, a smartphone, a digital media player, and the like may connect to a service provider when it is within range of a Wi-Fi network connected to the service provider. A typical access point (also commonly known as a hotspot) usually has a range on the order of 10s of meters when indoors and a greater range outdoors. Multiple overlapping access points may be used to provide coverage over larger areas.

In Wi-Fi, a communications channel is shared by stations under a mechanism referred to as a distributed channel access using a function called a distributed coordination function (DCF), which uses a carrier sense multiple access with collision avoidance (CSMA/CA). The DCF uses both physical and virtual carrier sense functions to determine the state of the communications channel (also commonly referred to as the medium). The physical carrier sense resides in a physical (PHY) layer and uses energy detection and preamble detection with frame length deferral to determine when the medium is busy. The virtual carrier sense resides in the media access control (MAC) layer and uses reservation information carried in a duration field of MAC headers announcing impending use of the medium. The virtual carrier sense mechanism is called the network allocation vector (NAV). In general, the medium is deemed to be idle only when both the physical carrier sense and the virtual carrier sense mechanisms indicate it to be so.

SUMMARY

Example embodiments of the present disclosure which provide a system and method for managing contention in a wireless communications system.

In accordance with an example embodiment of the present disclosure, a method for transmitting to an access point is provided. The method includes receiving, by a station, a selective condition and a selective contention period from the access point, and comparing, by the station, the selective condition to a selective parameter. The method further includes contending, by the station, for use of a transmission medium during the selective contention period if the selective parameter meets the selective condition.

In accordance with another example embodiment of the present disclosure, a method for controlling access to a transmission medium is provided. The method includes transmitting, by an access point, a selective condition and a selective contention period to a plurality of stations, wherein the selective condition is used for determining permission for contention for access of the transmission medium during the selective contention period. The method also includes receiving, by the access point, a transmission from a station in the plurality of stations having permission to contend for access of the transmission medium.

In accordance with another example embodiment of the present disclosure, a station is provided. The station includes a receiver, and a processor operatively coupled to the receiver. The receiver receives a selective condition and a selective contention period from an access point. The processor compares the selective condition to a selective parameter, and contends for use of a transmission medium during the selective contention period if the selective parameter meets the selective condition.

One advantage of an embodiment is that medium contention from a large number of non-access point stations (non-AP stations) which would ordinarily freeze access to the medium is alleviated by granting only a subset of the non-AP stations meeting a selection condition to contend for the medium.

A further advantage of an embodiment is that the non-AP stations themselves determine which non-AP stations meet the selection condition, so contention overhead is distributed and not placed solely on the AP.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to managing contention in a wireless communications system. For example, a station receives a selection condition from an access point during a selection contention period. The station compares the selection condition with a selection parameter and if the selection parameter meets the selection condition, the station contends for use of a transmission medium. For example, an access point transmits a selection condition to a plurality of stations. The selection condition is used for determining access to a selection contention period. The access point receives a transmission from a station in the plurality of stations in the selection contention period.

The present disclosure will be described with respect to example embodiments in a specific context, namely an IEEE 802.11 compliant communications system with a large number of non-AP stations. The disclosure may also be applied, however, to other standards compliant and non-standards compliant communications systems that support large numbers of communications devices using CSMA/CA.

Figure 1:
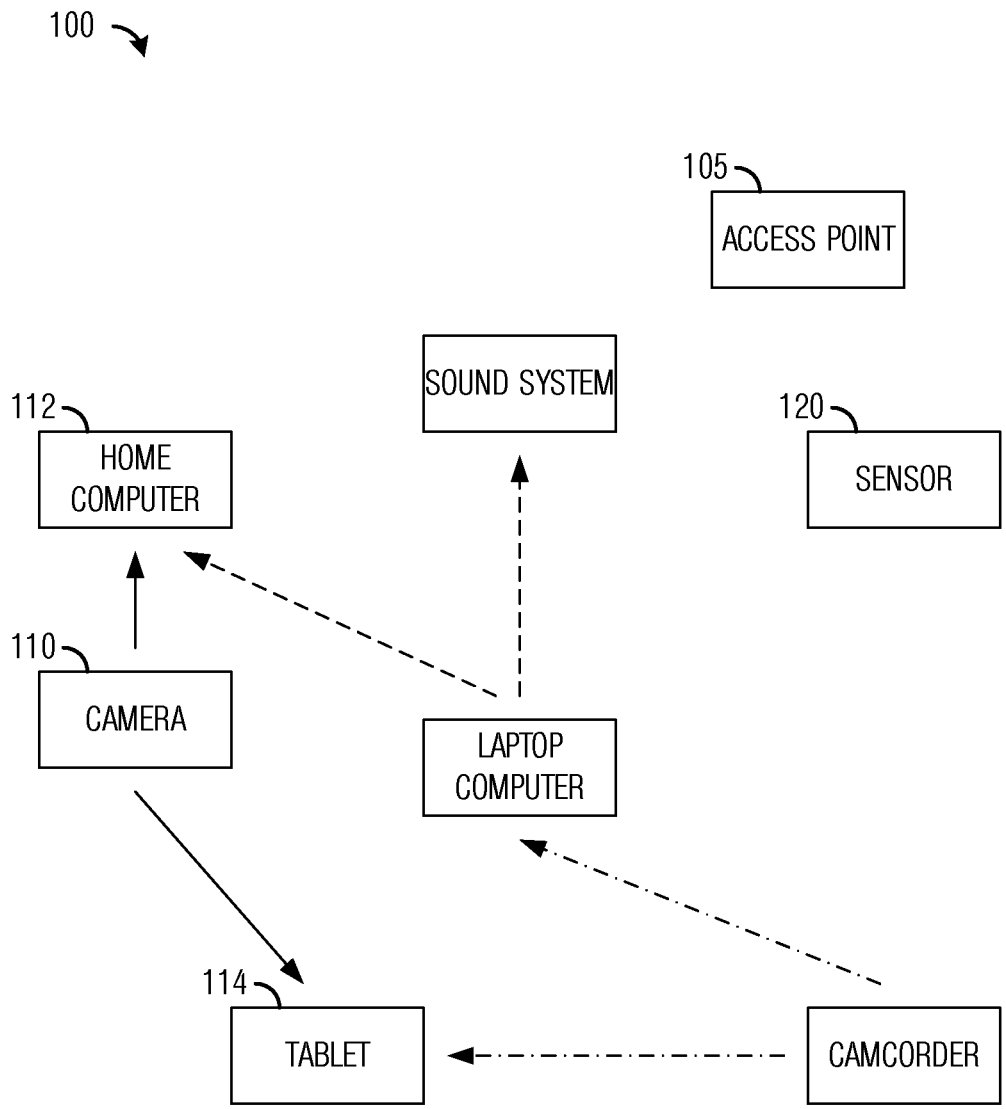
FIG. 1 illustrates an example communications system according to example embodiments described herein.

FIG. 1 illustrates an example communications system 100. Communications system 100 may include a plurality of stations, which may be classified into one of two types: access points (AP) or non-AP stations. In general, an AP may be considered to be a communications controller, and in other types of communications systems, may be referred to as a base station, a NodeB, an evolved NodeB, and the like. Non-AP stations may be considered to be all other devices, and in other types of communications systems, may be referred to as mobile stations, user equipments, mobiles, terminals, subscribers, users, and the like. As shown in FIG. 1, communications system 100 includes a plurality of Wi-Fi enabled devices (i.e., non-AP stations or non-AP STAs) that are capable of communicating with one another through an AP 105. Furthermore, the non-AP stations may also communicate with AP 105. Typically, a first non-AP station, such as a camera no may communicate with a second non-AP station, such as a home computer 112, and/or a third non-AP station, such as a tablet 114, by transmitting to AP 105, which in turn transmits to the second non-AP station or the third non-AP station. It is noted that the transmission to AP 105 and from AP 105 are not shown in FIG. 1. Instead, when FIG. 1 illustrates a transmission between two non-AP stations, e.g., camera 110 to tablet 114, there is a first implied transmission from camera no to AP 105 and a second implied transmission from AP 105 to tablet 114, which are not shown.

In a CSMA/CA communications system, such as a communications system that is IEEE 802.11 compliant, when a station (either a non-AP station or an AP) has a transmission to make, it may first perform a clear channel assessment (CCA) by sensing the medium for a first specified duration, e.g., a DCF inter-frame space (DIFS). If the medium is busy, the station waits for the medium to go idle, defer for a second specified duration, e.g., a DIFS, and wait for an additional random backoff period. If the medium remains idle during the second specified duration and the backoff period, the station assumes that it may take ownership of the medium and begins a frame transmission.

Figure 2:
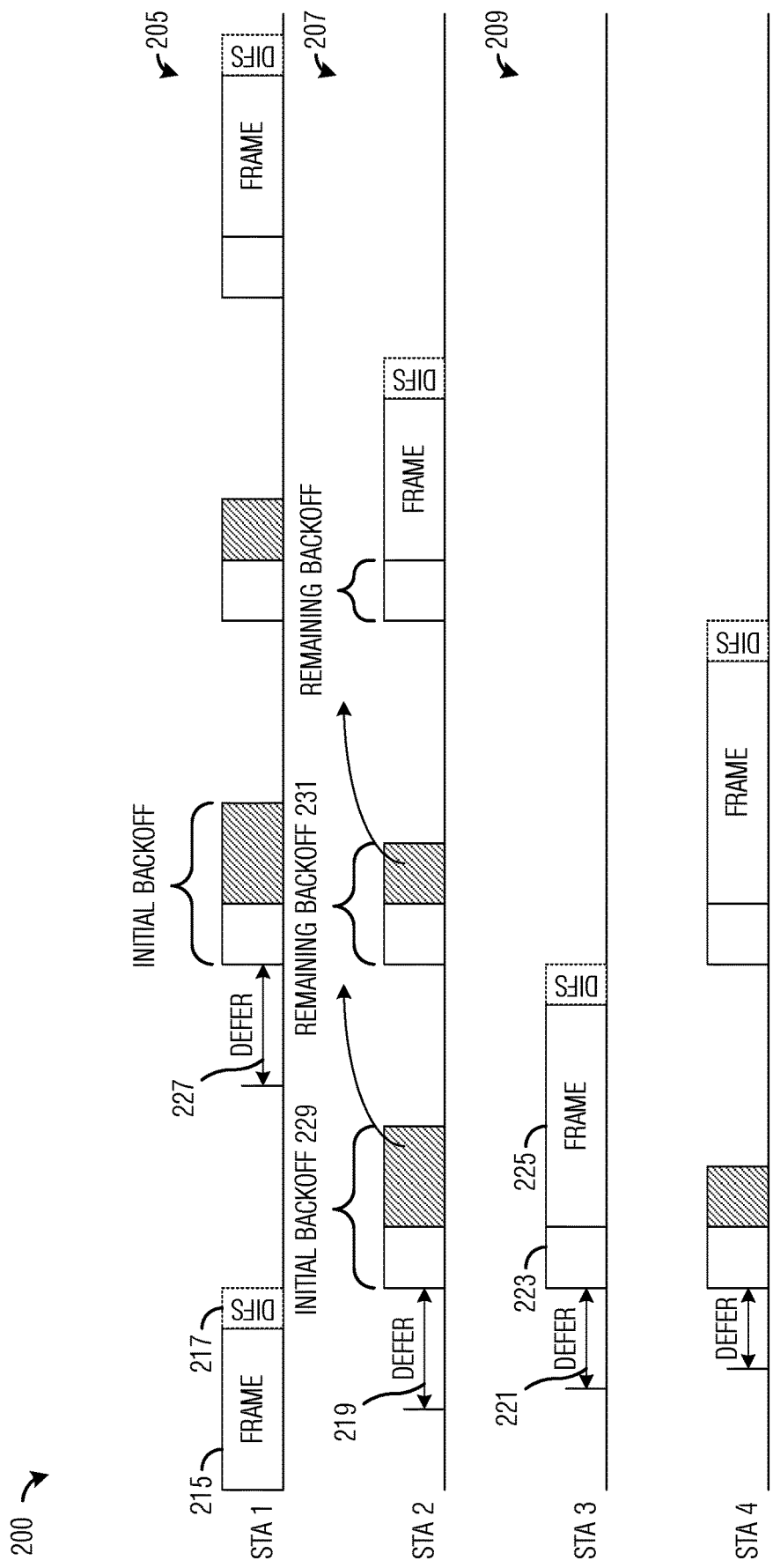
FIG. 2 illustrates an example diagram of operations from a plurality of stations according to example embodiments described herein.

FIG. 2 illustrates a diagram 200 of operations from a plurality of stations. As shown in FIG. 2, operations of a first station (STA 1) are shown in trace 205, operations of a second station (STA 2) are shown in trace 207, and operations of a third station (STA 3) are shown in trace 209. For discussion purposes, consider a situation wherein STA 1 is transmitting a frame 215 and then waits for a specified duration, e.g., DIFS 217, once it completes transmission of frame 215. STA 2 may have a transmission to make, but when it detects the medium, it determines that the medium is busy due to STA 1 transmitting frame 215. STA 2 waits for the medium to become idle, shown as defer period 219. Similarly, STA 3 has a transmission to make, but when it detects the medium, it determines that the medium is busy due to STA 1 transmitting frame 215. STA 3 waits for the medium to become idle, shown as defer period 221.

Due to randomness of the backoff period, STA 3 is able to take ownership of the medium after the second specified duration 223 and transmits frame 225. While STA 3 is transmitting, STA 1 has another transmission to make, but it senses that the medium is busy, so it defers (shown as defer period 227). After the end of defer period 227, STA 1 performs its initial backoff. Similarly, STA 2 finds the medium busy after its initial backoff 229 and has to perform a remaining backoff 231.

Figure 3:
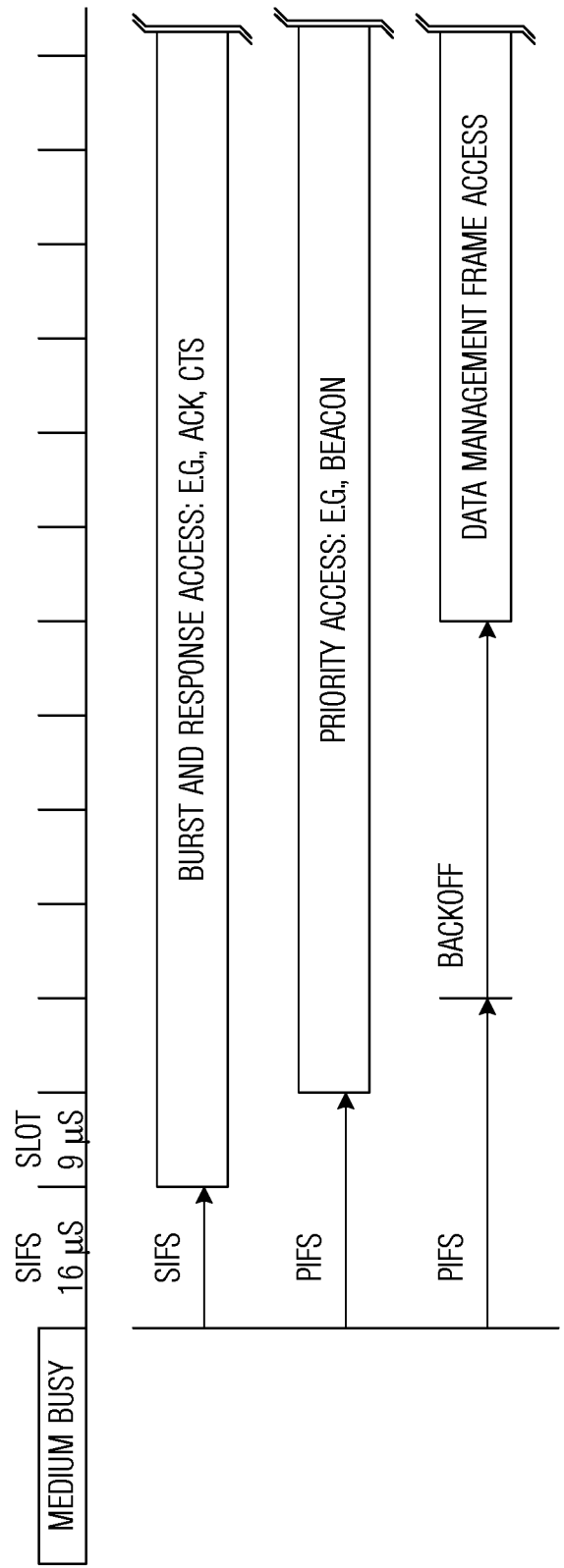
FIG. 3 illustrates an example diagram of channel access timing according to example embodiments described herein.

FIG. 3 illustrates a diagram 300 of channel access timing. As shown in FIG. 3, a short inter-frame space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration.

Figure 4:
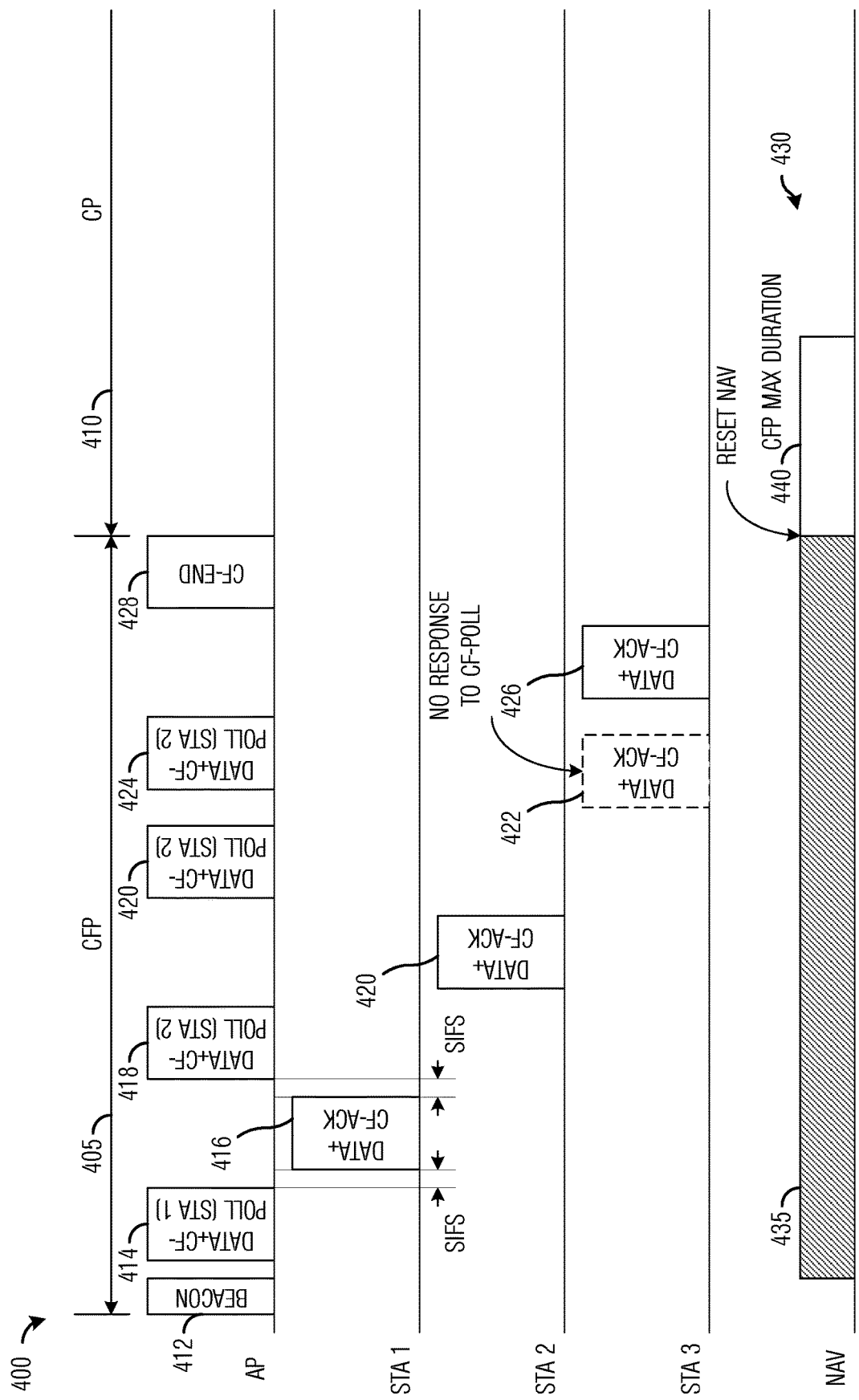
FIG. 4 illustrates an example diagram of operations from a plurality of stations operating in a contention free mode according to example embodiments described herein.

FIG. 4 illustrates a diagram 400 of operations from a plurality of stations operating in a contention free mode. In IEEE 802.11, a contention free mode for data transmission may be supported with a PCF that resides in an AP. The AP establishes a contention free period (CFP) during which access to the medium is coordinated by the AP. The AP may send a poll message to the stations and the polled station may access the medium as indicated in the poll message.

As shown in FIG. 4, an AP establishes a CFP 405 and a contention period (CP) 410. During CFP 405, the AP may transmit a beacon 412 as well as poll messages for different stations served by the AP. For example, the AP may poll STA 1 with a poll message 414. STA 1 may respond with a transmission 416, which may include an acknowledgement (ACK) to poll message 414. Similarly, the AP may poll STA 2 with a poll message 418 and STA 2 may respond with a transmission 426. The AP may also poll STA 3 with a poll message 420. However, for some reason, STA 3 does not respond to poll message 420 (shown as dashed transmission 422). Therefore, the AP may poll STA 3 again with a poll message 424 and STA 3 may respond with transmission 426. The AP may mark the end of CFP 405 with a CF-END message 428. Highlight 430 illustrates the state of a NAV in a station. While in CFP 405, the state of the NAV is set to a first value (shown as shaded box 435) and when CFP 405 ends and CP 410 begins, the state of the NAV changes to a second value (shown as clear box 440).

Clearly, even with just three stations as shown in FIG. 2, contention for the medium is an involved process and it may be difficult for a station to obtain ownership of the medium. As an example, studies have shown that when there are more than 20 stations contending for the medium, a probability of collision is more than 90%. Furthermore, when there are more than 60 stations, the medium will be blocked and no station will be able to obtain ownership of the medium. However, it is proposed in IEEE 802.11ah, that an AP is to support up to 6000 stations with a high probability that more than 100 stations will be simultaneously contending for the medium. Therefore, there is a need for a contention technique that has lower probability of collision while providing good fairness to the stations contending for the medium.

According to an example embodiment, a distributed technique based on a selective (or equivalently, selection) contention criterion (or simply selective (or equivalently, selection) condition) that has the individual stations determine if they are able to contend for ownership of the medium may be used. In general, if a station meets the selection condition, the station may contend for ownership of the medium. The selection condition may be configured so that a subset of the stations served by the AP may meet the selection condition. As an example, the selection condition may be configured so that a total of 5 to 20 stations may contend for ownership of the medium at any given time. The distributed technique does not require an AP to provide much processing, thereby freeing the AP to do other tasks. Furthermore, the distributed technique does not require more transmissions by the AP and/or the stations, therefore, the medium is free for use by the stations to communicate information.

According to an example embodiment, the stations meeting the selection condition(s) may contend for the medium during a selective (or equivalently, selection) contention period (SCP). In other words, stations that meet the selection condition(s) have permission to contend for the medium during the SCP. Therefore, the SCP may be one technique that may implement a prioritization of the stations. As an example, the stations that meet the selection condition (e.g., higher priority stations) may contend for the medium during the SCP, while those stations that do not meet the selection condition (e.g., lower priority stations) may not. Additionally, a regular contention period may also be used to allow the stations that do not meet the selection condition (as well as those that do meet the selection condition) to contend for the medium. Multiple SCPs, regular contention periods, and/or selection condition(s) may be used to implement multiple priority levels.

Figure 5A:
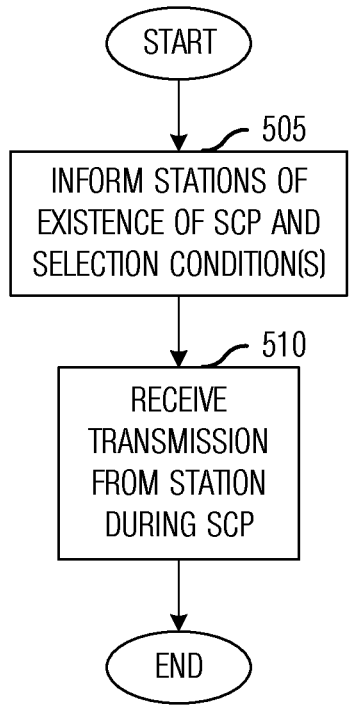
FIG. 5a illustrates an example flow diagram of AP operations in initiating an SCP and receiving a transmission during the SCP according to example embodiments described herein.

FIG. 5a illustrates a flow diagram of AP operations 500 in initiating an SCP and receiving a transmission during the SCP. AP operations 500 may be indicative of operations occurring in an AP, such as AP 105, as the AP initiates an SCP and receives a transmission during the SCP.

AP operations 500 may begin with the AP informing the stations of an SCP and one or more selection conditions (block 505). The AP may provide information regarding the SCP, such as a duration of the SCP, frequency band(s) if applicable), and the like. The duration of the SCP may be analogous to an interval of time reserved for transmission by stations that may contend for the medium during the SCP. The AP may inform the stations of the one or more selection conditions in a broadcast message, such as a beacon message, probe response message, polling message, any other existing broadcast message, or a contention period poll (SC-POLL) message. The selection conditions may also be transmitted in a polling message unicast to specific stations. If an existing broadcast message is used, an information element (IE) containing the one or more selection conditions may be included in the existing broadcast message. The AP may also provide information about the SCP, including duration, starting point (e.g., time, frame, subframe, and the like), ending point (e.g., time, frame, subframe, and the like), frequency, frequency band, and the like.

The one or more selection conditions may actually be determined, selected, specified, and the like, by an AP, a non-AP station, an operator of the communications system, a technical standards document, and the like. In addition to informing the stations of the one or more selection conditions, the AP may inform the stations about an existence of the SCP. The AP may inform the stations of the existence of the SCP and the one or more selection conditions in a single message or in multiple messages.

The IE or the SC-POLL message may include one or more of the following: Duration, Selection Condition(s), Transmitter Address, Repeat Mode (or Repetition Mode), Beginning Time, and the like. The Duration field defines how long the SCP will last or/and if SCP can be terminated early or not. The Selection Condition(s) field defines the characteristics or requirements (i.e., the selection condition) that the stations need to match, or even more, a checking method (e.g. calculation method) the stations shall use to verify if they match the selection conditions. The Transmitter Address field is the MAC address of the transmitter who sent the IE or SC-POLL message. The Repeat Mode field defines whether the SCP is repeated and what is the interval for repeating. The Beginning Time defines when the SCP will begin, which can be a time offset to the SC-POLL message or the message carrying the IE, or a definite time point.

As an illustrative example, consider a situation where the Selection Condition(s) field is a MAC Address Range specifying a range of station MAC addresses that can contend for the medium in the SCP. It is noted that association identifiers (AID) may be used in place of MAC addresses. As another illustrative example, the Selection Condition field is a Geographic Position Range specifying a geographical area of stations that can contend for the medium in the SCP. As another illustrative example, the Selection Condition field is a Channel Condition Range specifying a range of channel conditions of stations that can contend for the medium in the SCP. As another illustrative example, the Selection Condition field is a Service Type specifying service classes of stations that can contend for the medium in the SCP. As another illustrative example, the Selection Condition field is a Device Type specifying types of stations that can contend for the medium in the SCP. As another illustrative example, the Selection Condition field is a Random Variable (or Random Variable Range) specifying a random variable value or range used to select stations that can contend for the medium in the SCP. As another illustrative example, the Selection Condition field is a Frame Type specifying frames of transmissions of stations that can contend for the medium in the SCP. As another illustrative example, the Selection Condition field is an Excluded Selection Condition specifying which Selection Condition type that is excluded from contending for the medium in the SCP.

As an example, the Duration field can be the same as a Duration/ID field in current IEEE 802.11 standards (refer to Duration/ID definition in P802.11REVmb-Do.8 or P802.11ac_D1.0). The Selection Condition(s) field can be a MAC Address Range, a Geographic Position Range, a Channel Condition Range, a Service Type, a Device Type, a Random Variable (or a Random Variable Range), Frame Type, or any other characteristics or requirements.

A single IE or SC-POLL message may include a plurality of Selection Condition fields, with each Selection Condition field potentially containing different selection conditions. As an alternative, a single IE or SC-POLL message may include a single Selection Condition field that contains a plurality of selection conditions, with the selection conditions being the same or different, or a combination thereof.

Figure 6:
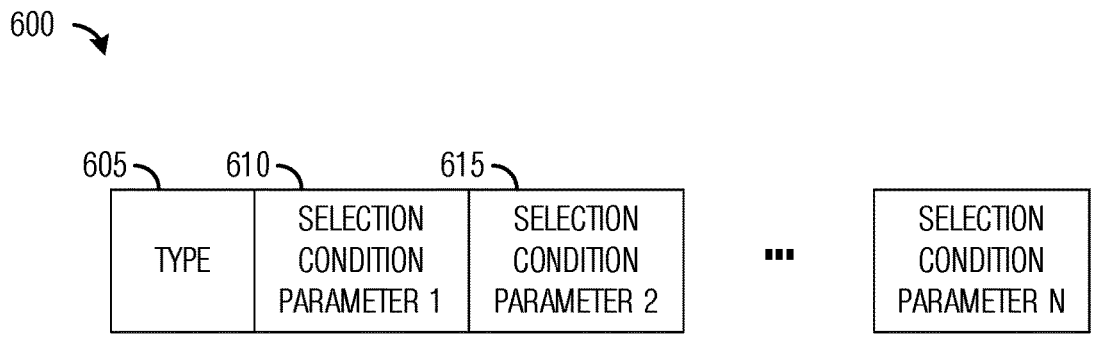
FIG. 6 illustrates an example Selection Condition field according to example embodiments described herein.

FIG. 6 illustrates an example Selection Condition field 600. Selection Condition field 600 may include a type field 605 that indicates a type of the selection condition, e.g., MAC Address Range, Geographic Position Range, Channel Condition Range, Service Type, Device Type, Random Variable (or Random Variable Range), Frame Type, Excluded Selection Condition, and the like. Type field 605 may hold a value, e.g., an integer value, to indicate a type of the selection condition. As an example, a zero in type field 605 may indicate a MAC Address Range Type field 605 may be 1 bit, 2 bits, 3 bits, 1 byte, multiple bytes, and the like, depending on a number of selection condition types supported.

Selection condition field 600 may include one or more selection condition parameters, such as selection condition parameter 1 610, selection condition parameter 2 615, and the like, of the selection condition type indicated in type field 605. The number of selection condition parameters may be dependent on the selection condition type. As an example, if the selection condition type is MAC Address Range, then there may be three selection condition parameters: MAC Address Checking Value (such as a hash array value), MAC Address Calculating Parameter (such as a hash array length), and Calculating Method (such as a hashing function).

Referring back to FIG. 5a, the AP may receive a transmission from a station during the SCP (block 510). The transmission may be from a station that met the selection condition(s) provided by the AP, which permitted it to contend for the medium during the SCP. Once the station takes ownership of the medium, it is able to transmit to the AP. In other words, the transmission may be from a station having permission to contend for the medium and was able to obtain the medium during contention. It is noted that the station(s) that meet the selection condition(s) and the selection contention period may be grouped together. The grouping may be a logical grouping (such as an AID range of addresses, MAC address range of addresses, Access Control address range of addresses, channel condition information range, service type(s), device type(s), frame type(s), and the like) or a physical grouping (e.g., stations operating within an antenna beam pattern, stations operating within a geographical area, and the like).

Figure 5B:
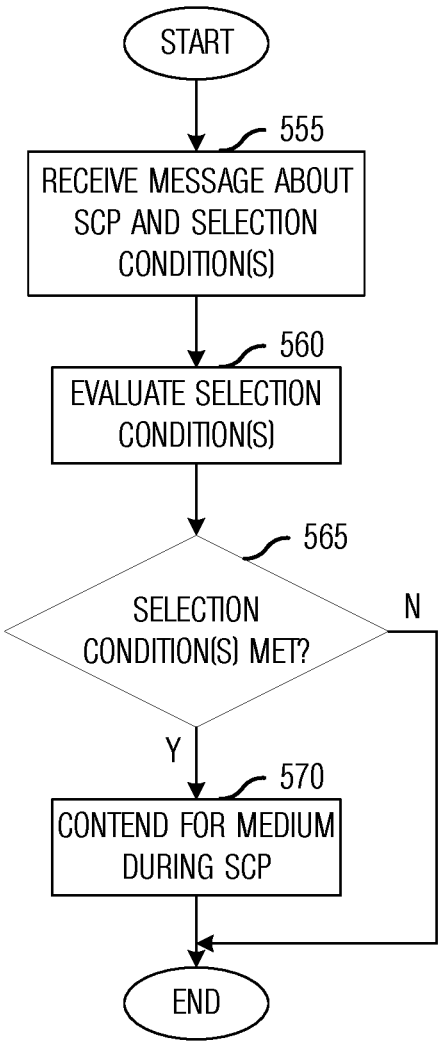
FIG. 5b illustrates an example flow diagram of station operations in contending for a medium during an SCP according to example embodiments described herein.

FIG. 5b illustrates a flow diagram of station operations 550 in contending for a medium during an SCP. Station operations 550 may be indicative of operations occurring in a station, such as camera 110, home computer 112, sensor 120, and the like, as the station contends for the medium during an SCP.

Station operations 550 may begin with the station receiving information about an SCP and one or more selection conditions (block 555). The information may be received in a broadcast message, such as a beacon message, a probe response message, a polling message, any other existing broadcast message, or a SC-POLL message. The selection conditions may also be received in a polling message unicast from the access point. If an existing broadcast message is used, an IE containing the one or more selection conditions may be included in the existing broadcast message. The IE or the SC-POLL message may include one or more of the following: Duration, Selection Condition(s), Transmitter Address, Repeat Mode, Beginning Time, and the like.

The station may evaluate (or compare) the selection condition(s) provided by the AP using its selection parameters to determine if it can contend for the medium during the SCP (block 560). Depending on the selection condition (s), the station may perform different operations.

As an illustrative example, consider a situation where the Selection Condition(s) field is a MAC Address Range. Then a station receives such a selection condition, it may check whether its MAC address (i.e., its selection parameter) matches or complies with the selection condition. If it matches, the station is selected and may start contending for ownership of the medium, otherwise it may need to wait for another SCP. There could be several different ways to make MAC Address as a selection condition, which is described as follows:

1. The MAC Address Range may be a range of two values, (or a specific list of MAC addresses), for example, [value 1, value 2] (where value 1 is smaller than or equal to value 2), and when the station checks the selection condition, it takes its MAC address with 48 bits (i.e., its selection parameter), as an example, and checks whether the address is within the range (e.g., larger than or equal to value 1 and smaller than or equal to value 2) or complies with the selection condition. If it is, it matches the selection condition.

2. Another example method of using the MAC Address as a Selection Condition is as follows: the AP informs the MAC Address Range field as a range of two values (and may potentially some other parameters that may be referred to as Calculation Parameters). For discussion purposes, suppose that the two values are V1 and V2, therefore, the range is indicated as [V1, V2]. The stations use their MAC Address (i.e., their selection parameter) and Calculation Parameters to perform a calculation using a calculation function, and get a calculation result. As an example, the calculation result may be described as a formula:

Calc_Result=Calculation_Function(MAC Address, Calculation Parameter).

Then the station compares the Calc_Result with the range value broadcasted as the Selection Condition, and if the Calc_Result is within the range (e.g., larger than or equal to V1 and smaller than or equal to V2), the selection parameter complies with the selection condition and the station is selected for contention during the SCP. As an example, the Calculation Function may be a Hash Function, therefore, V1 and V2 are Hash Array Values, with the Calculation Parameter being a Hash Array Length. It is noted that a Hash Function is an example Calculation Function. Other calculation functions and methods may be adopted in the industry.

When the station checks to determine if it satisfies the selection condition, it may use a Hash Function with its MAC Address as an input (e.g., a key), so that it obtains a result of the Hash Function with its MAC Address as an input parameter, which may be expressed as:

Calc_Result=Hash_Function(MAC Address,Array Length).

Again, the hash function is used as an example. Other functions may be used. As an example, a Hash Function can be defined as:

Taking each byte of the 4 bytes of the MAC Address as an 8-bit value, and adding up all the 4 values to get a 10-bit value, and then continuing the splitting and adding until a Calc_Result of required length ($2^{\wedge}$(length of the Calc_Result) equal to Hash Array Length). As an alternative, the Hash Function can be expressed as:

Splitting the 48 bits of the MAC Address into n number of values and each value is of length where $2^{\wedge}$(length) equal to the value defined in Hash Array Length, and applying an X-OR among all the n values to get a Calc_Result.

Figure 7:
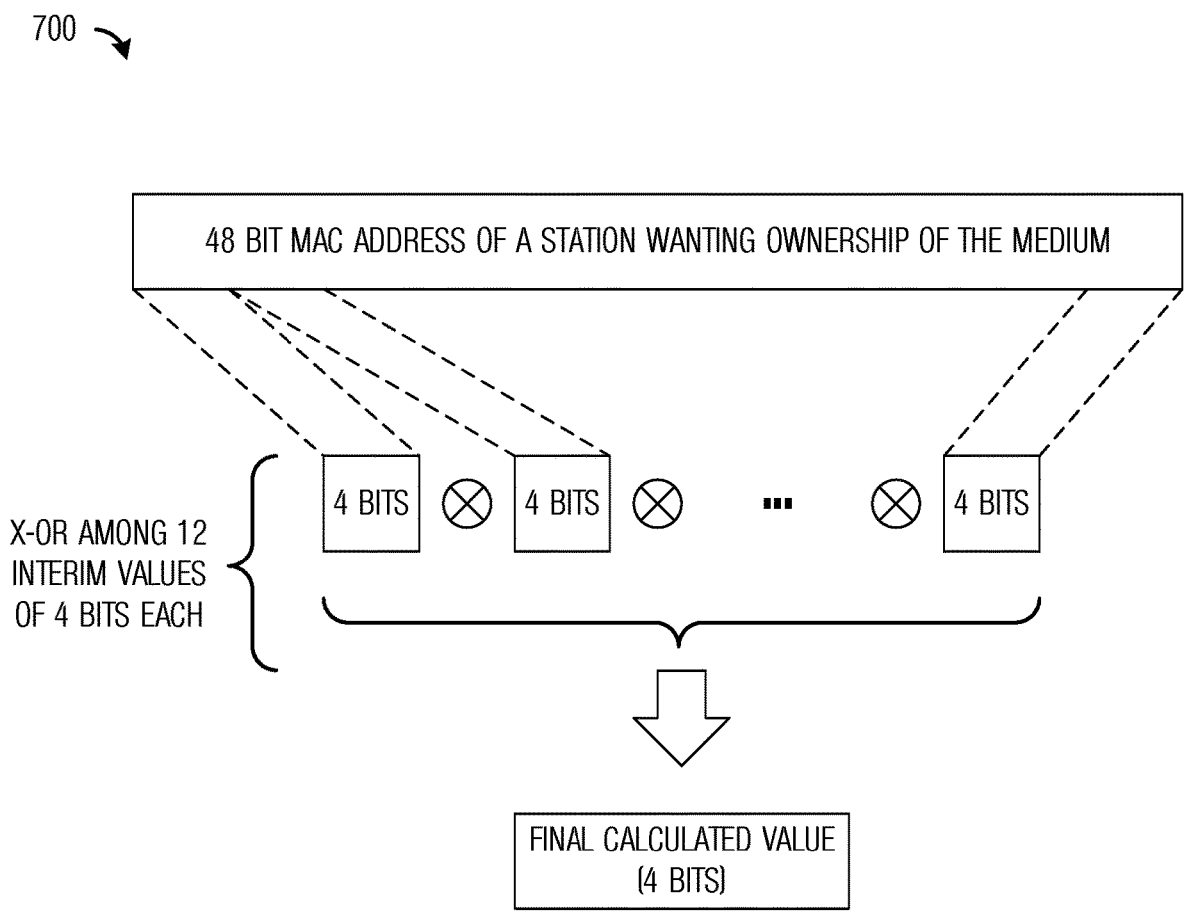
FIG. 7 illustrates an example Selection Contention Calculation with MAC addresses (e.g., a 48 bit long MAC address) according to example embodiments described herein.

FIG. 7 illustrates an example Selection Contention Calculation 700 with MAC addresses (e.g., a 48 bit long MAC address). As shown in FIG. 7, a Hash Function (e.g., an X-OR function) is used as an example to show the MAC Address based calculating function. As an example, the Hash Array Length=16, so the Calc_Result length is 4 bits, and the range is indicated as [V1, V2]. Calculating Method among the interim values split from MAC Address is also an X-OR function.

Referring back to FIG. 5b, as another illustrative example, the Selection Condition field is a Geographic Position Range or Geographical Position Information. The Selection Condition field may contain a central position and a radius, opposite corners of a rectangle, and the like. When a station receives such an IE, it may check to determine whether its location (i.e., its selection parameter) is in or complies with the geographic range defined by the parameters of the IE. If it is in the geographic range defined by the parameters of the IE, it may contend for the medium during the SCP, otherwise, it cannot contend for the medium in the SCP.

As another illustrative example, the Selection Condition field is a Channel Condition Range or Channel Condition Information. The field may contain a modulation and coding scheme feedback (MFB) value, a signal to noise ratio (SNR) value, a signal to noise plus interference ratio (SINR) value, or another value that reflect the channel condition between the receiver and transmitter (or a value range). When the station receives such an IE, it may check to determine whether the received signal (i.e., its selection parameter) satisfies or complies with the channel condition requirement or it is within the range, if verified the station may contend for the medium during the SCP, otherwise it cannot contend for the medium in the SCP.

As another illustrative example, the Selection Condition field is a Service Type. The Selection Condition field may contain a type of service or a list of type of services. As an example, World Wide Web (WWW), file transfer protocol (FTP), Email, Voice over IP (VoIP), Emergency Call, Emergency Service, and the like. When a station receives such an IE, it may check to determine whether it is running a service (i.e., its selection parameter) indicated in the Selection Condition field or complies with the selection condition. If it is, the station may contend for the medium during the SCP.

As another illustrative example, the Selection Condition field is a Device Type. The field may contain a type of device or a list of types of devices. As an example, a smart grid meter, an industrial sensor, an health monitoring device, a security monitoring device, a weather sensing device, a laptop, a handset, and the like. When a station receives such an IE, it may check to determine whether it (i.e., its selection parameter) is or complies with one of the types of device indicated in the Selection Condition field. If it is, the station may contend for the channel access during the SCP, otherwise, it cannot contend for the medium in the SCP. It is noted that the Selection Condition field may be a list of values that indicating different type of devices. As an example, a "1" can indicate smart grid meter, a "2" can indicate industrial sensor, and the like.

As another illustrative example, the Selection Condition field is a Random Variable (or Random Variable Range). The Selection Condition field may contain a random variable (or a random variable range), and may also contain one or more random parameters (depending on a random generator used). When a station receives this Selection Condition field, it generates a random variable (i.e., its selection parameter) with the one or more random parameters using a random variable generator. It is noted that there are many random variable generators and anyone could be used. Then the station may check to determine whether the generated random variable is equal to or is within (i.e., complies with) a range of random numbers specified by the AP. If the generated random variable is equal to or is within the range of random numbers, then the station may contend for the medium during the SCP. The station may also generate a random variable at specified time instances (for example when it first connects to the AP and receive a random variable parameter, or at the beginning of an SCP).

An example of the Selection Condition field being a Random Variable is as follows: the Selection Condition field contains a Random Variable=3, and a Random_Parameter=6. Upon receiving the Selection Condition field, the station generates a random variable which is between 1 and 6. If the generated random variable is 3, the station satisfies the selection condition, so it may contend for the medium in the SCP, otherwise, the station cannot contend for the medium in the SCP.

As another illustrative example, the Selection Condition field is a Frame Type. The Selection Condition field may contain one or more types of frames, for example, Data Frame, Management Frame, Control Frame, Association Frame, Authentication Frame, Ack Frame, and the like. When a station receives this Selection Condition field, it may perform a check to determine whether its MAC frames (i.e., its selection parameter) that is sent in transmissions matches or complies with one or more of the Frame Types contained in the Selection Condition field. If it matches, the station may contend for the medium during the SCP, otherwise, it cannot contend for the medium in this SCP.

As another illustrative example, the Selection Condition field is an Excluded Selection Condition indicator. The Selection Condition field may contain, for example, when the selection condition is Frame Type, the Excluded Selection Condition may be Exclude Data Frame. Therefore, when the station receives such a Selection Condition field, if it has any frame (i.e., its selection parameter for this particular example) that is not or does not complies with a data frame as a frame type, it may contend for the channel access during the SCP. Another example is when the selection condition is MAC Address Range, the Excluded Selection Condition may be Exclude Range [V1, V2], so the stations with MAC addresses are outside the range [V1, V2] may contend for the medium during the SCP, otherwise, it cannot contend for the medium in this SCP.

The station may perform a check to determine if the selection condition(s) have been met (block 565). If the selection condition(s) have been met, then the station may contend for the medium during the SCP (block 570). As an example, the station may utilize a standard specified contention technique, such as shown in FIG. 2, to contend for the medium during the SCP. If the selection condition(s) has not been met, then the station may not content for the medium during the SCP.

Figure 8:
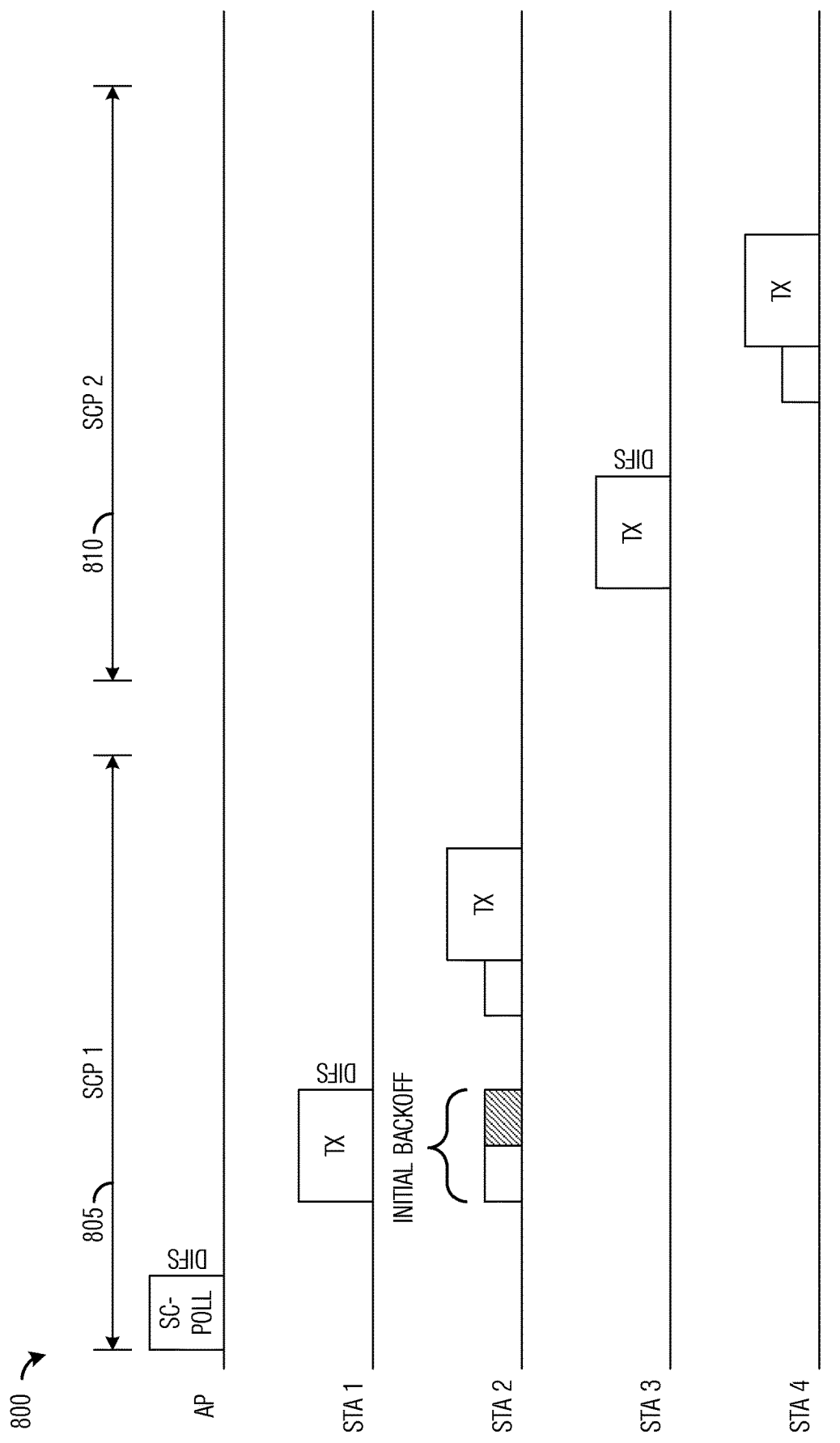
FIG. 8 illustrates an example diagram of operations from a plurality of stations operating in a communications having a first SCP and a second SCP according to example embodiments described herein.

FIG. 8 illustrates a diagram 800 of operations from a plurality of stations operating in a communications having a first SCP 805 and a second SCP 810. As shown in FIG. 8, STA 1 and STA 2 contend for the medium in first SCP 805, and due to randomness, STA 1 obtains ownership of the medium before STA 2 and transmits. STA 2 may subsequently transmit after STA 1 finishes. Also shown in FIG. 8, STA 3 and STA 4 contend for the medium in second SCP 810. Since the medium is idle and due to randomness, STA 3 is able to obtain ownership of the medium and transmit. STA 4 may subsequently transmit after STA 3 finishes. It is noted that due to SCPs and selection conditions, STA 1 and STA 2 contend for the medium in first SCP 805, while STA 3 and STA 4 contend for the medium in second SCP 810. It is also noted that although not shown in FIG. 8, additional SCPs are possible, as well as a non-SCP where the stations may contend for the medium.

According to an example embodiment, in addition to or in lieu of using one or more SCPs, time may also be used to prioritize stations attempting to contend for the medium. Time durations may be assigned according to a selection condition, which may or may not be the same selection condition as used to determine if a station may contend for the medium during an SCP. As an example, stations that meet a selection condition may allowed to use a shorter inter frame space or a shorter backoff window or both, while stations that do not meet the selection condition may use a longer inter frame space or a longer backoff window or both.

Figure 9A:
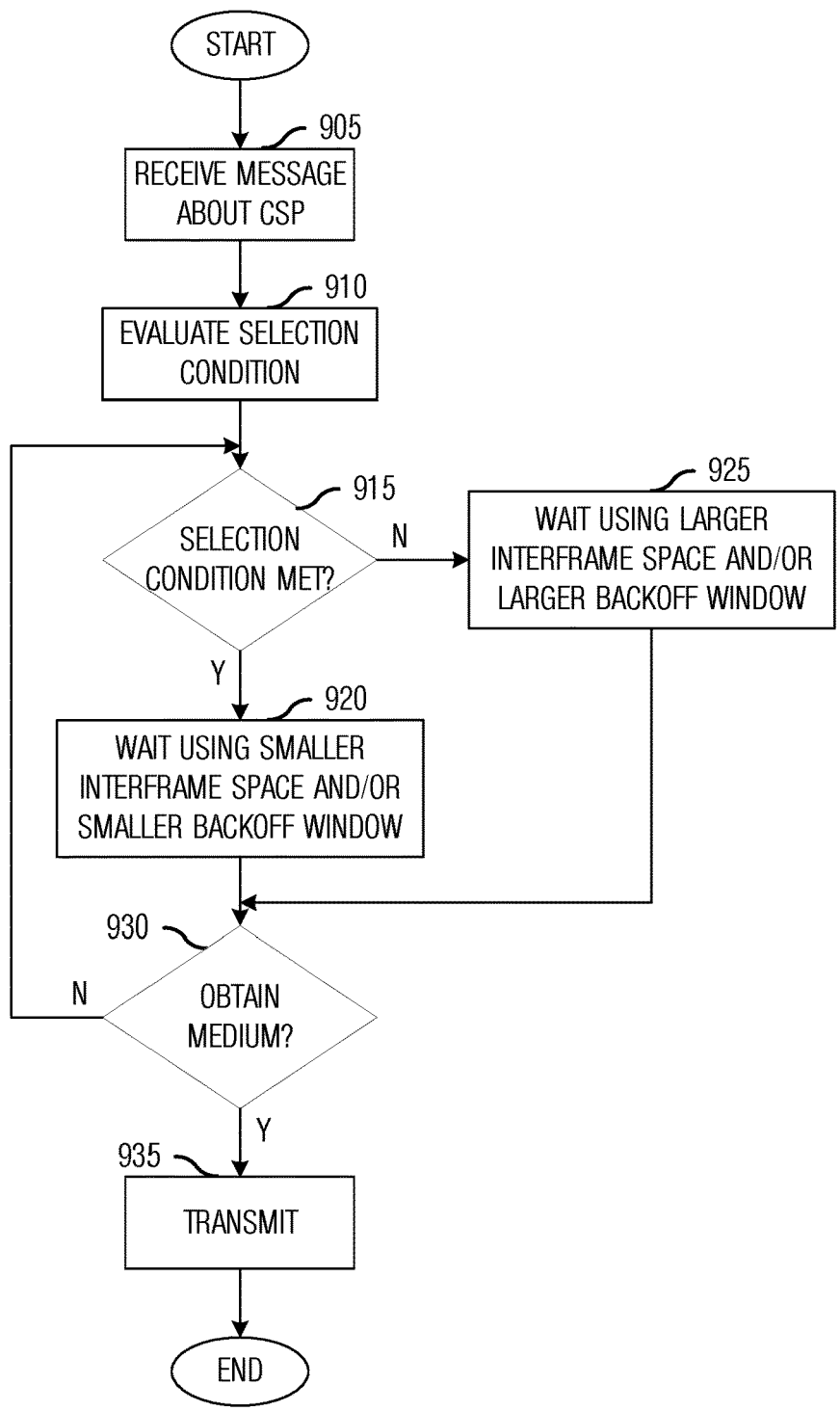
FIG. 9a illustrates an example flow diagram of station operations in contending for a medium wherein station priority is enabled using time according to example embodiments described herein.

FIG. 9a illustrates a flow diagram of station operations 900 in contending for a medium wherein station priority is enabled using time. Station operations 900 may be indicative of operations occurring in a station, camera 110, home computer 112, sensor 120, and the like, as the station contends for the medium during an SCP wherein station priority is enabled using time.

Station operations 900 may begin with the station receiving information about an SCP and one or more selection conditions (block 905). The information may be received in a broadcast message, such as a beacon message, a probe response message, a polling message, any other existing broadcast message, or a SC-POLL message. The selection conditions may also be received in a polling message unicast by the access point to specific stations. If an existing broadcast message is used, an IE containing the one or more selection conditions may be included in the existing broadcast message.

The station may evaluate the selection condition(s) provided by the AP to determine if it can contend for the medium during the SCP (block 910). The station may perform a check to determine if it has met the selection condition(s) (block 915). If the station has met the selection condition(s) then the station may use a shorter inter frame space or a shorter backoff window or both while contending for the medium (block 920). If the station has not met the selection condition(s), then the station may use a longer inter frame space or a longer backoff window or both while contending for the medium (block 925). The station may then perform a check to determine if it has obtained the medium (block 930). If the station has obtained the medium, the station may transmit (block 935). If the station has not obtained the medium, the station may return to block 915 to continue to contend for the medium.

According to an example embodiment, an SCP may be implemented in conjunction with the prioritizing provided by the time duration. As an example, different values for inter frame space and/or backoff window may be used for contention during the SCP and outside of the SCP. According to an example embodiment, multiple selection conditions and different values for inter frame space and/or backoff window may be used to provide multiple priority levels. As an example, a first selection condition may be used to enable SCP and regular contention period operation, and then additional selection condition(s) may be used to prioritize stations within the SCP.

According to an example embodiment, prioritization using time may also be used without SCP and selection conditions. As an example, polled stations (such as shown in FIG. 4) may use shorter inter frame space and/or shorter backoff windows while non-polled stations may use longer inter frame space and/or longer backoff windows, or vice versa.

Figure 9B:
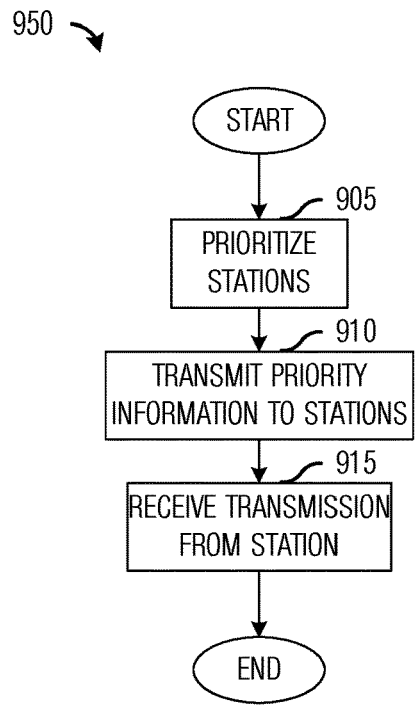
FIG. 9b illustrates an example flow diagram of AP operations in enabling contending for a medium wherein station priority is enabled using time according to example embodiments described herein.

FIG. 9b illustrates a flow diagram of AP operations 950 in enabling contending for a medium wherein station priority is enabled using time. AP operations 950 may be indicative of operations occurring in an AP, such as AP 105, as the AP enables contending for a medium wherein station priority is enabled using time.

AP operations 950 may begin with the AP prioritizing stations (block 905). The AP may assign priorities to different stations that it is serving. As an example, the AP may prioritize the stations according to service type, subscriber type, device type, traffic type, frame type, geographical location, MAC address, random variable, and the like. The AP may transmit priority information to the stations (block 910). The AP may transmit priority information to the station by transmitting a poll message containing a selection condition that sets a priority for the stations, a broadcast message containing an IE that includes the selection condition that sets the priority for the stations, individually poll the stations to provide them with their respective priority, and the like. The AP may receive a transmission from a station (block 915).

Figure 10:
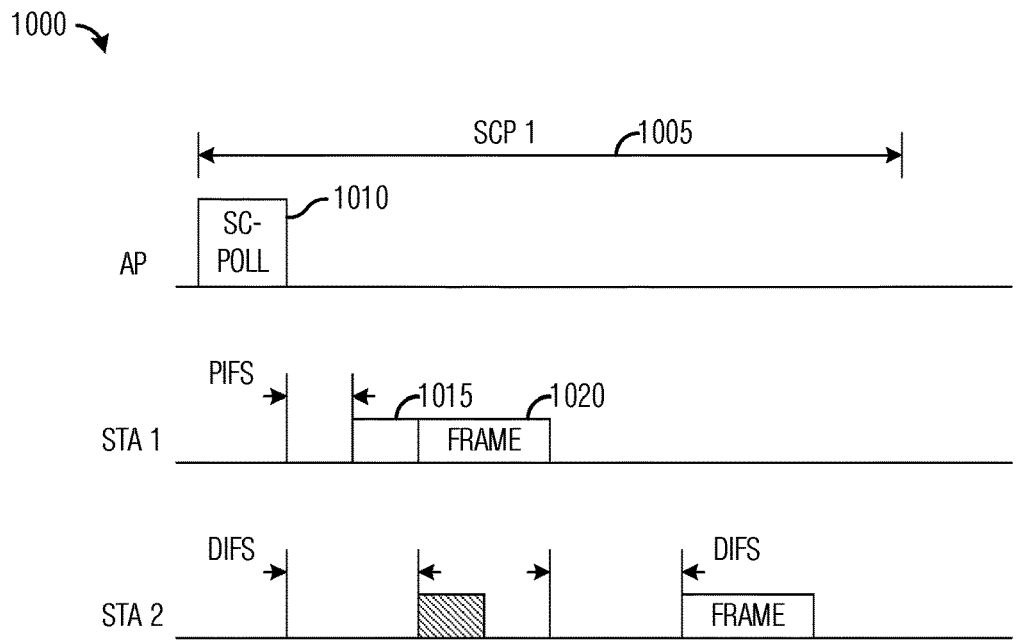
FIG. 10 illustrates an example diagram of operations of a plurality of stations operating in a communications system wherein prioritization is implemented using time according to example embodiments described herein.

FIG. 10 illustrates a diagram 1000 of operations of a plurality of stations operating in a communications system wherein prioritization is implemented using time. As shown in FIG. 10, the communications system includes an AP, and two stations, STA 1 and STA 2. During an SCP 1005, the AP may transmit an SC-POLL 1010, which includes a selection condition. For discussion purposes, assume that STA 1 meets the selection condition provided by the AP while STA 2 does not. STA 1 may then contend for the medium with a shorter inter frame space (e.g., a PIFS) and/or a shorter backoff window (e.g., backoff window 1015), while STA 2 may content for the medium with a longer inter frame space (e.g., a DIFS) and/or a longer backoff window. By the time STA 2 has completed its inter frame space (the DIFS), STA 1 has already obtained the medium and transmitted a frame 1020. Therefore, STA 2 detects that the medium is no longer idle and must wait until the medium is idle again and wait its inter frame space.

In general, an SCP may be valid for a specified period of time. However, an AP and/or a station may be able to terminate the SCP before the specified period of time expires. As an example, an AP may terminate the SCP early because there is no utilization of the medium during the SCP, thereby leading to waste of the available resources. As another example, a station may terminate the SCP early because it has to make an urgent transmission and it is not able to contend for the SCP since it does not meet the selection condition(s).

Figures 11A, 11B:
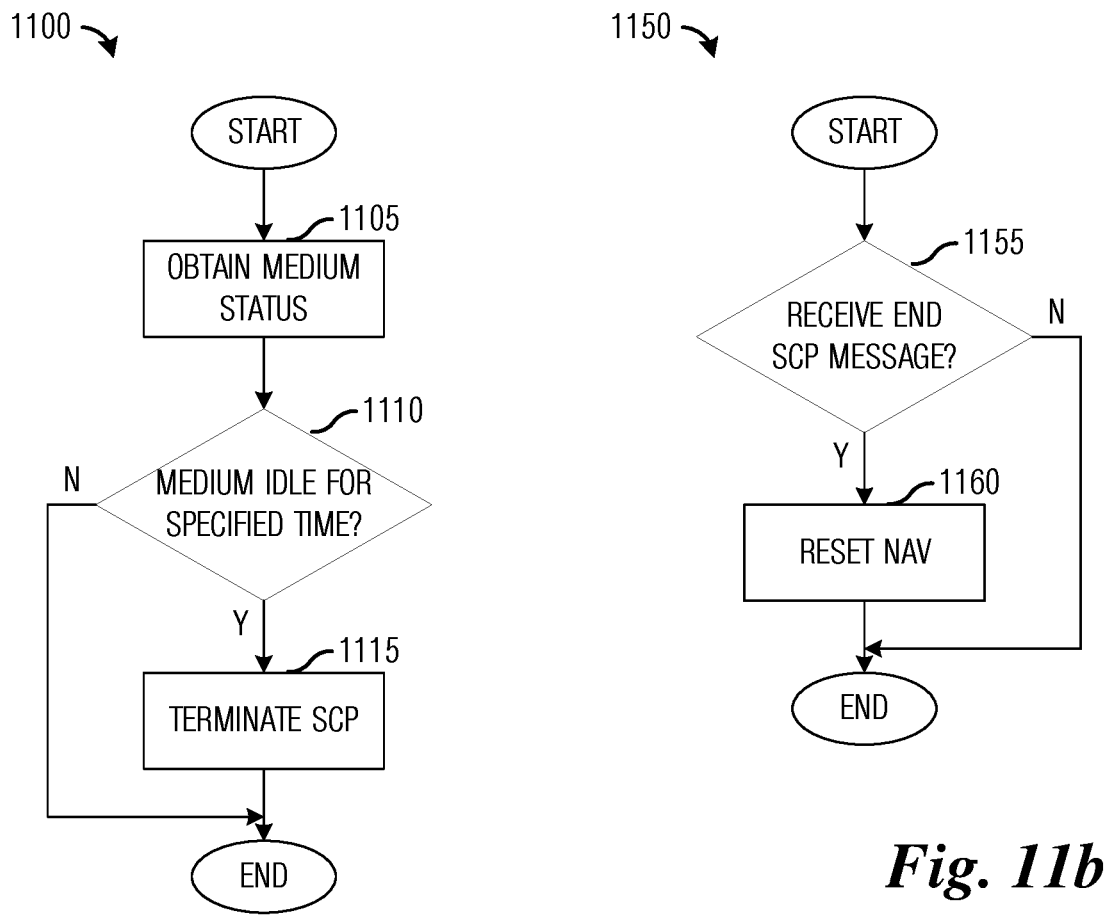
FIG. 11a illustrates an example flow diagram of AP operations in terminating an SCP according to example embodiments described herein.
FIG. 11b illustrates an example flow diagram of station operations in terminating an SCP according to example embodiments described herein.

FIG. 11a illustrates a flow diagram of AP operations 1100 in terminating an SCP. AP operations 1100 may be indicative of operations occurring in an AP, such as AP 105, as the AP terminates an SCP.

AP operations 1100 may begin with the AP determining the status of the medium (block 1105). The AP may sense the medium and determine if it is idle or busy. If the medium is idle, the AP may determine how long the medium has been idle. As an alternative example, the AP may determine a usage ratio for the medium, e.g., a ratio of idle time to total time or a ratio of busy time to total time.

The AP may perform a check to determine if the medium has been idle for a specified amount of time (block 1110). The specified amount of time may be specified by an operator of the communications system, a technical standard, based on usage history, based on a number of stations not in the SCP that have information to transmit, and the like. The specified amount of time may be a fixed value (e.g., a DIFS plus a minimum contention window duration, or a DIFS plus a maximum contention window duration), or, for example, can be set as follows:

1. When in the first contention round (A contention round may be a time that the stations contend the medium and one of the stations obtains ownership of the medium. When the medium owner (the station that was able to obtain the medium) finishes transmission and dismisses its ownership, a new contention round begins), the specified amount of time may be set as a delayed inter frame space (e.g., PIFS or DIFS, which depends on which delayed inter frame space is adopted in the mechanism) plus a minimum contention window duration (CW_min). It can be expressed as DIFS+CW_min, or PIFS+CW_min.

2. When in a second contention round, the specified amount of time may be the lesser of the delayed inter frame space (PIFS or DIFS) plus 2 times the minimum contention window (CW_min), and the maximum contention window (CW_max). It can be expressed as minimum {(DIFS or PIFS)+2*CW_min), CW_max}. It is noted that the multiplier of the minimum contention window may be set to values other than 2.

3. When in the n-th contention round, the specified amount of time may be the lesser of the delayed inter frame space (PIFS or DIFS) plus 2 to the power (n−1) times the minimum contention window (CW_min) or the maximum contention window (CW_max). It can be expressed as minimum {(DIFS or PIFS)+2^(n−1)*CW_min, CW_max}. It is noted that the multiplier of the minimum contention window may be set to values other than 2. It is also noted that the expressions described in items 1-3 are merely illustrative examples of possible expressions for setting the specified amount of time and that other expressions are possible.

If the medium has been idle for more than the specified amount of time, the AP may terminate the SCP (block 1115). The AP may terminate the SCP by transmitting a new poll message or a broadcast message containing an IE that terminates the SCP. If the medium has not been idle for more than the specified amount of time, the AP may allow the SCP to continue. It is noted that the AP may utilize other measures to determine the termination of the SCP, such as the usage ratio described previously.

FIG. 11b illustrates a flow diagram of station operations 1150 in terminating an SCP. Station operations 1150 may be indicative of operations occurring in a station, such as camera no, home computer 112, sensor 120, and the like, as the station terminates an SCP.

Station operations 1150 may begin with the station performing a check to determine if the station has received a message indicating the termination of the SCP (block 1155). If the station has received such a message, the station may reset its NAV (block 1160). Typically, resetting the NAV may result in the station not contending for use of the transmission medium for the duration of the SCP. In other words, the station may stop contending for use of the transmission medium for the duration of the SCP. If the station has not received such a message, the station may continue contending for the medium in the SCP if it meets the selection condition(s) for the SCP.

Figure 12:
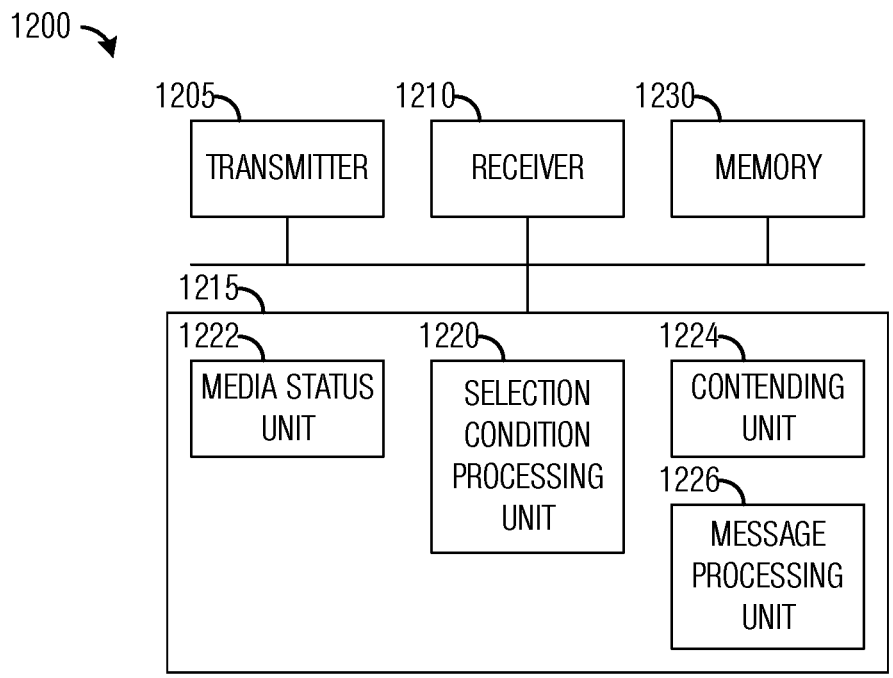
FIG. 12 illustrates an example first communications device according to example embodiments described herein.

FIG. 12 illustrates a diagram of a first communications device 1200. Communications device 1200 may be an implementation of a non-AP station of a communications system. Communications device 1200 may be used to implement various ones of the embodiments discussed herein. As shown in FIG. 12, a transmitter 1205 is configured to send messages, and the like, and a receiver 1210 is configured to receive messages, and the like. Transmitter 1205 and receiver 1210 may have a wireless interface, a wireline interface, or a combination thereof.

A selection condition processing unit 1220 is configured to determine if communications device 1200 meets a selection condition. Selection condition processing unit 1220 determines if communications device 1200 meets the selection condition using selection parameter(s) of communications device 1200. A media status unit 1222 is configured to determine a status of a medium. Media status unit 1222 determines if the medium is idle or busy by physically sensing the medium, for example. A contending unit 1224 is configured to contend for ownership of an idle medium according to contention rules as specified by a technical standard, an operator of the communications system, and the like. Contending unit 1224 is configured to wait specified periods of time, such as inter frame space, backoff window, and the like. A message processing unit 1226 is configured to process messages received by communications device 1200, such as poll messages, broadcast messages containing IEs, and the like. A memory 1230 is configured to store selection conditions, selection parameters, SCP information, medium status, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, transmitter 1205 and receiver 1210 may be implemented as a specific hardware block, while selection condition processing unit 1220, media status unit 1222, contending unit 1224, and message processing unit 1226 may be software modules executing in a processor 1215, such as a microprocessor, a digital signal processor, a custom circuit, or a custom compiled logic array of a field programmable logic array. Additionally, selection condition processing unit 1220, media status unit 1222, contending unit 1224, and message processing unit 1226 may be stored in memory 1230.

Figure 13:
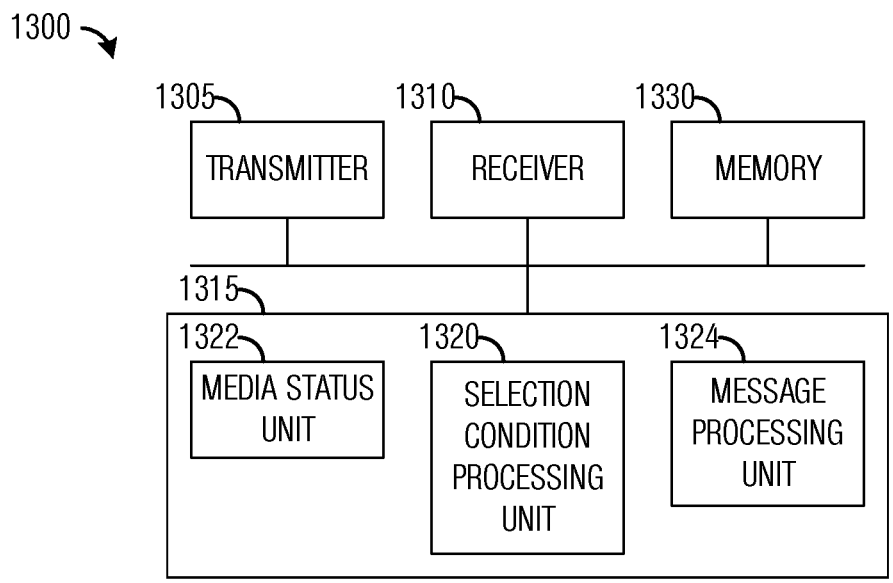
FIG. 13 illustrates an example second communications device according to example embodiments described herein.

FIG. 13 illustrates a diagram of a second communications device 1300. Communications device 1300 may be an implementation of an AP station of a communications system. Communications device 1300 may be used to implement various ones of the embodiments discussed herein. As shown in FIG. 13, a transmitter 1305 is configured to send messages, polls, and the like, and a receiver 1310 is configured to receive messages, and the like. Transmitter 1305 and receiver 1310 may have a wireless interface, a wireline interface, or a combination thereof.

A selection condition processing unit 1320 is configured to determine selection conditions for an SCP. Selection condition processing unit 1320 selects selection conditions to permit a desired number of stations to contend for a medium during the SCP. A selection condition that is too relaxed may allow too many stations to contend for the medium and lead to blockage of the medium, while a selection condition that is too tough may result in too few stations contending for the medium and lead to underutilization of the medium. Selection condition processing unit 1320 also determines if an SCP is to be terminated early according to medium metrics. A media status unit 1322 is configured to determine a status of the medium. Media status unit 1322 also determines how long the medium has been in a specified state, as well as determining metrics according to the state of the medium. A message processing unit 1324 is configured to generate messages to be transmitted by communications device 1300, such as poll messages, broadcast messages, and the like. A memory 1330 is configured to store selection conditions, SCP information, medium status, medium metrics, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, transmitter 1305 and receiver 1310 may be implemented as a specific hardware block, while selection condition processing unit 1320, media status unit 1322, and message processing unit 1324 may be software modules executing in a processor 1315, such as a microprocessor, a digital signal processor, a custom circuit, or a custom compiled logic array of a field programmable logic array. Additionally, selection condition processing unit 1320, media status unit 1322, and message processing unit 1324 may be stored in memory 1330.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
    receiving, by a station from an access point, a broadcast message comprising:
        a time field indicating a time duration of a selection contention period;
        a selection condition-type field indicating a media access control (MAC) address range field is present in the broadcast message;
        a selection condition field containing a calculating parameter; and
        the MAC address range field containing a MAC address range parameter; and
    contending, by the station, for use of a transmission medium during the selection contention period, in response to a successful comparison of a station MAC address of the station with the MAC address range parameter.

2. The method of claim 1, wherein each MAC address within the MAC address range is assigned to at most a single respective station.

3. The method of claim 1, the calculating parameter being a length parameter, and the method further comprises using, by the station, the length parameter in comparing the station MAC address to the MAC address range parameter.

4. The method of claim 1, wherein the broadcast message is a beacon message, a probe response message, a management frame, or a polling message.

5. The method of claim 1, further comprising:
    receiving, by the station from the access point, a second broadcast message comprising a second time field containing a second selection contention period, a second selection condition-type field, and a second selection condition field, and a second MAC address range field containing a second MAC address range parameter; and
    waiting, by the station, until an expiration of the second selection contention period to again contend for the transmission medium, in response to an unsuccessful comparison of the station MAC address with the second MAC address range parameter.

6. The method of claim 1, further comprising:
    receiving, by the station, a selection contention period terminate indicator; and
    stopping, by the station, contending for use of the transmission medium for a remainder of the selection contention period.

7. The method of claim 1, further comprising:
    receiving, by the station, a selection contention period terminate indicator; and
    resetting, by the station, a network allocation vector.

8. The method of claim 1, the selection condition-type field further indicating that a second selection condition field is present in the broadcast message.

9. The method of claim 8, the second selection condition field comprising a second selection parameter selected from the group consisting of: geographical position of the station, channel condition of the station, service type of the station, device type of the station, or a frame type of a transmission that the station intends to send.

10. A station comprising:
    a non-transitory memory storage comprising instructions; and
    a processor in communication with the non-transitory memory storage, wherein the processor executes the instructions to:
        receive, from an access point, a broadcast message comprising:
            a time field indicating a time duration of a selection contention period;
            a selection condition-type field indicating a media access control (MAC) address range field is present in the broadcast message;
            a selection condition field containing a calculating parameter; and the MAC address range field containing a MAC address range parameter; and contend for use of a transmission medium during the selection contention period, in response to a successful comparison of a station MAC address of the station with the MAC address range parameter.

11. The station of claim 10, wherein each MAC address within the MAC address range is assigned to at most a single respective station.

12. The station of claim 10, wherein the calculating parameter is a length parameter, and wherein the processor executes the instructions to use the length parameter in comparing the station MAC address to the MAC address range parameter.

13. The station of claim 10, wherein the broadcast message is a beacon message, a probe response message, a management frame, or a polling message.

14. The station of claim 10, wherein the processor executes the instructions to:

receive, from the access point, a second broadcast message comprising a second time field containing a second selection contention period, a second selection condition-type field, and a second selection condition field, and a second MAC address range field containing a second MAC address range parameter;

wait until an expiration of the second selection contention period to again contend for the transmission medium, in response to an unsuccessful comparison of the station MAC address with the second MAC address range parameter.

15. The station of claim 10, wherein the processor executes the instructions to:

receive a selection contention period terminate indicator; and stop contending for use of the transmission medium for a remainder of the selection contention period.

16. The station of claim 10, wherein the processor executes the instructions to:

receive a selection contention period terminate indicator; and reset a network allocation vector.

17. The station of claim 10, wherein the selection condition-type field further indicates that a second selection condition field is present in the broadcast message.

18. The station of claim 17, wherein the second selection condition field comprises a second selection parameter selected from the group consisting of: geographical position of the station, channel condition of the station, service type of the station, device type of the station, or a frame type of a transmission that the station intends to send.

19. A method comprising:

transmitting, by an access point to a plurality of stations, a broadcast message comprising:

a time field indicating a time duration of a selection contention period;

a selection condition-type field indicating a media access control (MAC) address range field is present in the broadcast message;

a selection condition field containing a calculating parameter; and the MAC address range field containing a MAC address range parameter; and receiving, by the access point, a contention transmission from a station of the plurality of stations having permission to contend for access to a transmission medium during the selection contention period, in accordance with a station MAC address of the station complying with the MAC address range parameter.

20. The method of claim 19, wherein each MAC address within the MAC address range is assigned to at most a single respective station.

21. The method of claim 19, the calculating parameter being a length parameter for use by the station in comparing the station MAC address to the MAC address range parameter.

22. The method of claim 19, wherein the broadcast message is a beacon message, a probe response message, a management frame, or a polling message.

23. The method of claim 19, further comprising:

receiving, by the access point after an expiration of the selection contention period, a second contention transmission from a second station of the plurality of stations, in accordance with a second station MAC address of the second station not complying with the MAC address range parameter.

24. The method of claim 19, further comprising:

transmitting, by the access point, a selection contention period terminate indicator prior to a predetermined end of the selection contention period.

25. The method of claim 19, the selection condition-type field further indicating that a second selection condition field is present in the broadcast message.

26. The method of claim 25, the second selection condition field comprising a second selection parameter selected from the group consisting of: geographical position of the station, channel condition of the station, service type of the station, device type of the station, or a frame type of a transmission that the station intends to send.

27. An access point comprising:

a non-transitory memory storage comprising instructions; and a processor in communication with the non-transitory memory storage, wherein the processor executes the instructions to:

transmit, to a plurality of stations, a broadcast message comprising:

a time field indicating a time duration of a selection contention period;

a selection condition-type field indicating a media access control (MAC) address range field is present in the broadcast message;

a selection condition field containing a calculating parameter; and the MAC address range field containing a MAC address range parameter; and receive a contention transmission from a station of the plurality of stations having permission to contend for access to a transmission medium during the selection contention period, in accordance with a station MAC address of the station complying with the MAC address range parameter.

28. The access point of claim 27, wherein each MAC address within the MAC address range is assigned to at most a single respective station.

29. The access point of claim 27, wherein the calculating parameter is a length parameter for use by the station in comparing the station MAC address to the MAC address range parameter.

30. The access point of claim 27, wherein the broadcast message is a beacon message, a probe response message, a management frame, or a polling message.

31. The access point of claim 27, wherein the processor executes the instructions to:

receive, after an expiration of the selection contention period, a second contention transmission from a second station of the plurality of stations, in accordance with a second station MAC address of the second station not complying with the MAC address range parameter.

32. The access point of claim 27, wherein the processor executes the instructions to:

transmit a selection contention period terminate indicator prior to a predetermined end of the selection contention period.

33. The access point of claim 27, wherein the selection condition-type field further indicates that a second selection condition field is present in the broadcast message.

34. The access point of claim 33, wherein the second selection condition field comprises a second selection parameter selected from the group consisting of: geographical position of the station, channel condition of the station, service type of the station, device type of the station, or a frame type of a transmission that the station intends to send.

* * * * *

UNITED STATES PATENT AND TRADEMARK OFFICE
CERTIFICATE OF CORRECTION

PATENT NO. : 10,674,539 B2
APPLICATION NO. : 15/982849
DATED : June 2, 2020
INVENTOR(S) : Chen et al.

Page 1 of 1

It is certified that error appears in the above-identified patent and that said Letters Patent is hereby corrected as shown below:

In the Claims

In Column 17, Line 26, Claim 14, delete "parameter;" and insert --parameter; and--.

Signed and Sealed this
Fifteenth Day of September, 2020

Andrei Iancu
*Director of the United States Patent and Trademark Office*